United States Patent [19]

Choate

[11] Patent Number: 4,477,197
[45] Date of Patent: Oct. 16, 1984

[54] BEARING

[75] Inventor: Bruce R. Choate, Saugas, Calif.

[73] Assignee: Sargent Industries, Inc., Los Angeles, Calif.

[21] Appl. No.: 574,524

[22] Filed: Jan. 27, 1984

Related U.S. Application Data

[62] Division of Ser. No. 256,083, Apr. 21, 1981, Pat. No. 4,428,689.

[51] Int. Cl.$^3$ .............................................. F16C 33/04
[52] U.S. Cl. .................................... 384/296; 384/297
[58] Field of Search ............... 384/296, 297, 299, 300, 384/294

[56] References Cited

U.S. PATENT DOCUMENTS 4,017,127  4/1977  Smith et al.
4,251,182  2/1981  Schroeder.
4,252,385  2/1981  Leitzel.

Primary Examiner—Lenard A. Footland
Attorney, Agent, or Firm—Ellsworth R. Roston; Charles H. Schwartz

[57] ABSTRACT

A movable member is made from a relatively hard material and is provided with a first surface. A bearing liner is attached to the first surface and is provided with relatively thin, hard and incompressible characteristics. A stationary member made from a harder material than the movable member is provided with a bearing surface which is polished and which abuts the bearing liner. Means retain the movable and stationary members in an optimal bearing relationship.

The movable and stationary members may be annular and may have a nested relationship so that the bearing surfaces are annular and the movable member is rotary. The retaining means may include a pair of stationary sleeves made from a similar material to the movable member and abutting each other at an intermediate position along the axial lengths of the bearing surfaces. Each of the sleeves may have a flange abutting axial extremities of the movable and stationary members. A pair of additional bearing liners may be respectively attached to the sleeve flanges at positions abutting the axial extremities of the movable and stationary members. Each of the additional bearing liners may be relatively thin, hard and incompressible.

In another embodiment, the stationary member is provided with a flange at one lateral extremity and a single sleeve is provided with a flange at the opposite lateral extremity. The additional bearing liners may be attached to the movable members at positions abutting the flanges.

3 Claims, 4 Drawing Figures

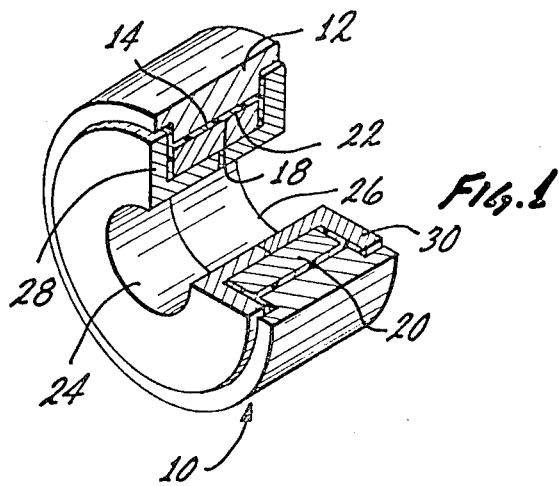
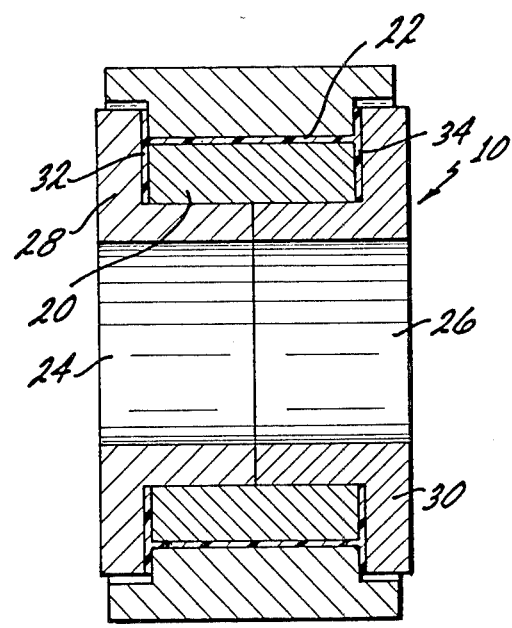
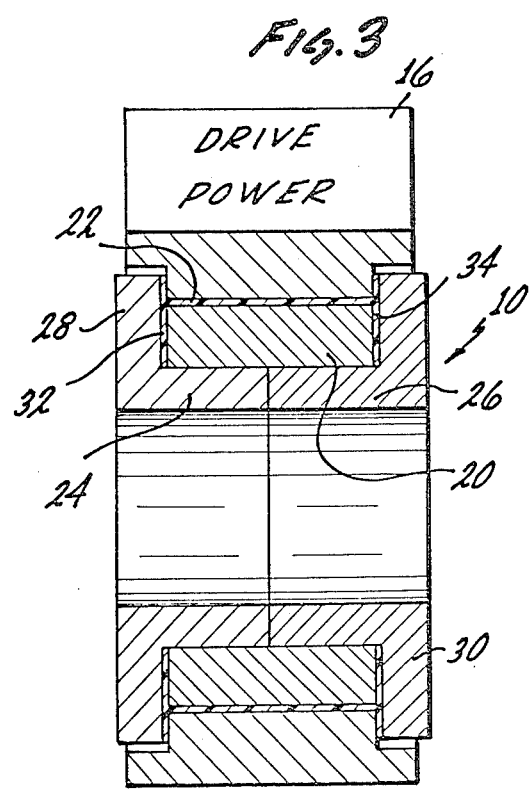
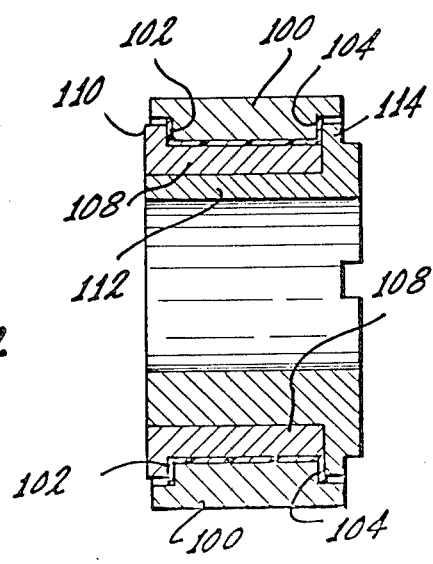

BEARING

This is a division of application Ser. No. 256,083 filed Apr. 21, 1981, now U.S. Pat. No. 4,428,689.

This invention relates to bearings and more particularly relates to bearings having a relatively simple construction and providing a long and maintenance-free life.

Aircraft now in use specify that moving parts shall be able to operate for long periods of time with relatively little or no maintenance. For example, bearings providing for the operation of ailerons on aircraft should be able to operate through tens of thousands of revolutions without any maintenance. This is particularly important to minimize the costs of operating the aircraft now that fuel costs have become so expensive.

The precision bearings now in use are generally needle bearings. The best needle bearings now in use generally have a life of approximately thirty thousand (30,000) revolutions. Furthermore, the needle bearings have to be greased after every five thousand (5,000) revolutions. The needle bearings have such a limited life even though the airlines specify that the bearings should be able to operate for as many as one hundred and sixty five thousand (165,000) revolutions without any maintenance.

A substantial effort has been made for a considerable period of time to provide bearings which will meet the objectives of the airlines. In spite of such substantial efforts, the objectives are far from being attained. As a result, the operation of many key components in the airplanes still have to be serviced regularly by maintenance personnel of the airlines, with the resultant possibility that unsatisfactory operation of such components from the negligence or oversight of such personnel will result. Furthermore, the costs of providing such maintenance are prohibitive.

This invention provides a bearing which more than meets the airline objectives. For example, the bearings are able to operate satisfactorily for at least one hundred and sixty five thousand (165,000) revolutions without any servicing by airline personnel. Actually, the bearings are able to operate through a considerably greater number of revolutions than that specified above without maintenance. Furthermore, the bearings are relatively simple in construction and easy to manufacture.

In one embodiment of the invention, a movable member is made from a relatively hard material and is provided with a first surface. A bearing liner is attached to the first surface and is provided with relatively thin, hard and incompressible characteristics. A stationary member made from a harder material than the movable member is provided with a bearing surface which is polished and which abuts the bearing liner. Means retain the movable and stationary members in an optimal bearing relationship.

The movable and stationary members may be annular and may have a nested relationship so that the bearing surfaces are annular and the movable member is rotary. The retaining means may include a pair of stationary sleeves made from a similar material to the movable member and abutting each other at an intermediate position along the axial lengths of the bearing surfaces. Each of the sleeves may have a flange abutting axial extremities of the movable and stationary members. A pair of additional bearing liners may be respectively attached to the sleeve flanges at positions abutting the axial extremities of the movable and stationary members. Each of the additional bearing lines may be relatively thin, hard and incompressible.

In another embodiment of the invention, the stationary member is provided with a flange at one lateral extremity and a single sleeve is provided with a flange at the opposite lateral extremity. The additional bearing liners may be attached to the movable member at positions abutting the flanges.

In the drawings:

FIG. 1 is a perspective view, partially broken away in section, of a bearing constituting one embodiment of the invention;

FIG. 2 is an enlarged sectional view of the bearing shown in FIG. 1;

FIG. 3 is a sectional view similar to that shown in FIG. 2 but also showing schematically apparatus for driving the rotary member in the bearing; and FIG. 4 is a sectional view of a second embodiment of the invention.

In one embodiment of the invention, a bearing generally indicated at 10 is provided. The bearing includes a movable member 12 made from a relatively hard member such as a 17-4 PH steel. The member 12 is preferably annular and hollow. When the member 12 is annular, a surface 14 may be annular and may be disposed at the inner surface of the member. Means 16 are provided for producing a movement of the member 12.

A bearing liner 18 is attached to the surface 14. The bearing liner 18 is preferably thin, hard and incompressible and is provided with a substantially uniform thickness. The bearing liner may be constructed as described in U.S. Pat. Nos. 3,594,049 and 3,900,408 respectively issued to Peter Turner on July 20, 1971 and Aug. 19, 1975 and assigned of record to the assignee of record of this application.

A stationary member 20 has a polished surface 22 disposed in frictional relationship with the bearing liner 18. The stationary member 20 is annular when the member 12 is annular. The member 20 is preferably made from a harder material, such as a 440 C steel, than the member 12.

Retaining means may also be included in the bearing. The retaining means may include a pair of sleeves 24 and 26. The sleeves 24 and 26 may be made from the same material as the movable member 12 or the stationary member 20. The sleeves 24 and 26 abut each other at an intermediate position along the axial length of the member 20.

The sleeves 24 and 26 are respectively provided with flanges 28 and 30 which abut the axial extremities of the members 12 and 20. Bearing liners 32 and 34 re respectively disposed between the flange 28 and the axial extremities of the members 12 and 20 and between the flange 30 and the axial extremities of the members 12 and 20. The bearing liners 32 and 34 may have the same composition and characteristics as the bearing liner 18.

The sleeves 24 and 26 are provided with dimensions to limit the side (or axial) play or lateral wobble of the members 12 and 20. This control of the side wobble is important in inhibiting the imposition of any stress upon the bearing liner 18. In this way, the life of the bearing liner is enhanced.

The disposition of the bearing liner on the rotatable member 12 and the formation of the liner from a thin, hard and incompressible material are important in providing the bearing with a long and maintenance free life. For example, the liner 18 is subjected to an even wear as it rotates past any load points on the stationary member 20. Furthermore, since the liner 18 is thin, hard and incompressible, it does not compress and expand as it moves past the load points on the stationary member. This is important in limiting any fatigue on the bearing liner.

Tests of the bearing described above have shown that the bearing has been able to withstand at least one hundred and sixty five thousand (165,000) revolutions without any maintenance. In that period, only half of the thickness of the liner has been worn away. This would indicate that the bearing should be able to withstand at least three hundred thousand (300,000) revolutions without any maintenance. This is in contrast to bearings now in use. These bearings have to be regreased every five thousand (5,000) revolutions and still have an average life expectancy of only approximately thirty thousand (30,000) revolutions.

The liners 32 and 34 are provided as a precautionary measure to insure that the member 12 will not rub against the flanges 28 and 30 when the member 12 rotates. The bearing liners 32 and 34 are extended into the space between the member 20 and the flanges 32 and 34 to maintain proper spacing between these members.

FIG. 4 illustrates a second embodiment of the invention. In this embodiment, a movable member 100 may be constructed as described above for the movable member 12 in the previous embodiment. However, bearing liners 102 and 104 may be attached to the lateral extremities of the movable member. The bearing liners 102 and 104 correspond to the liners 32 and 34 in the previous embodiment.

A stationary member 108 in FIG. 4 corresponds to the stationary member 20 in the previous embodiment. The stationary member may be provided at one lateral extremity with a flange 110 which abuts the bearing liner 102. A sleeve 112 provides substantially the same functions as the sleeves 24 and 26 in the previous embodiment. The sleeve 112 is provided with a flange 114 at the lateral extremity opposite the flange 110. The flange 114 abuts the bearing liner 104.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination,
a movable member made from a relatively hard material,
a bearing liner disposed on a first particular surface of the movable member in a thin layer and provided with relatively incompressible characteristics and with characteristics of resisting wear and fatigue,
a stationary member made from a relatively harder material and disposed in frictional relationship with the bearing liner, and
means disposed on the opposite side of the stationary member from the movable member for retaining the stationary member against the movable member and for inhibiting any lateral wobble between the stationary and movable members,
the stationary member being provided with a first flange at one lateral extremity and the retaining means constituting a sleeve with a second flange at the opposite lateral extremity and bearing liners being attached to one of the movable member and the first flange at the abutting position and to one of the movable member and the second flange at the abutting position.

2. In combination,
a hollow annular member made from a relatively hard material and provided with a first surface,
a second annular member made from a harder material than the hollow annular member and provided with a second surface in abutting relationship to the first surface,
a bearing liner attached to the first surface and engaging the second surface, the bearing liner being hard, thin and relatively incompressible and being provided with wear-resistant properties,
means for retaining the hollow member and the second member in a relationship in which the bearing liner abuts the second member,
the second surface being polished and the bearing liner being provided with a uniform thickness, and
flanges respectively disposed at one lateral extremity of the second annular member and
the opposite lateral extremity of the retaining means and the flanges being separated from the first annular member by bearing liners.

3. In combination,
a first annular member provided with relatively hard characteristics and with a first surface,
a second annular member provided with harder characteristics than the first annular member and with a bearing surface contiguous to the first surface,
the first and second members being disposed in nested relationship,
a bearing liner disposed on the first surface in frictional relationship with the bearing surface on the second member,
means for providing a rotation of the first annular member, and
means for maintaining the first and second members in a nested relationship,
the second annular member having a flange at one lateral extremity and the maintaining means having a flange at the opposite lateral extremity and bearing liners being disposed between the flanges and the first annular member.

* * * * *